US012689705B2

(12) United States Patent (10) Patent No.: US 12,689,705 B2
Aristidou et al. (45) Date of Patent: Jul. 21, 2026

(54) DISPLAY APPARATUS AND METHOD OF ASSEMBLY

(71) Applicant: Sky CP Limited, Isleworth (GB)

(72) Inventors: Andrew Aristidou, Isleworth (GB); Ross Grady, Isleworth (GB); Gregory Cruse, Isleworth (GB); Vincente Torres Hernandez, Isleworth (GB)

(73) Assignee: Sky CP Limited, Isleworth (GB)

( * ) Notice: Subject to any disclaimer, the term of this patent is extended or adjusted under 35 U.S.C. 154(b) by 0 days.

(21) Appl. No.: 18/989,887

(22) Filed: Dec. 20, 2024

(65) Prior Publication Data

US 2025/0126222 A1     Apr. 17, 2025

Related U.S. Application Data

(63) Continuation-in-part of application No. PCT/GB2023/051636, filed on Jun. 22, 2023.

(30) Foreign Application Priority Data

Jun. 22, 2022    (GB) ..................................... 2209142

(51) Int. Cl.
     *H04N 5/645*        (2006.01)
(52) U.S. Cl.
     CPC .................................... *H04N 5/645* (2013.01)
(58) Field of Classification Search
     None
     See application file for complete search history.

(56) References Cited

U.S. PATENT DOCUMENTS

2004/0164111 A1 *   8/2004   Nelson ................. B60Q 1/2611
                                                             224/326
2004/0165344 A1     8/2004   Lee
                             (Continued)

FOREIGN PATENT DOCUMENTS

CN          102724837 A     10/2012
EP          1318445 A2      6/2003
                  (Continued)

OTHER PUBLICATIONS

International Search Report of the International Searching Authority mailed on Nov. 16, 2023, issued in connection with International Application No. PCT/GB23/51636 (6 pages).

(Continued)

*Primary Examiner* — Eileen M Adams
(74) *Attorney, Agent, or Firm* — McCarter & English, LLP

(57)         ABSTRACT

A display apparatus comprises a display module, a frame for the display module, and a plurality of brackets for fixing the frame to the display module. The brackets each include a first section arranged to contact an inner surface of the frame, slots arranged to engage a corresponding projection from the inner section of the frame, and a second section arranged to contact an edge of the display module. The first and second sections of the brackets are perpendicular to each other. The display apparatus may include an internal support frame for supporting or housing internal components. A display apparatus may include at least one internal stand mounting bracket including a slot including a resilient part for receiving a corresponding rod of a base stand.

18 Claims, 11 Drawing Sheets

(56) References Cited

U.S. PATENT DOCUMENTS

| | | | |
|---|---|---|---|
| 2005/0050784 | A1 | 3/2005 | Bang et al. |
| 2009/0059115 | A1 | 3/2009 | Asano et al. |
| 2011/0116217 | A1 | 5/2011 | Lee et al. |
| 2015/0055027 | A1* | 2/2015 | Suzuki .................. H04N 5/642 |
| | | | 348/794 |
| 2016/0282908 | A1* | 9/2016 | Holden .................. G06F 1/181 |
| 2018/0270972 | A1* | 9/2018 | Kang ..................... H05K 1/028 |
| 2018/0302995 | A1 | 10/2018 | Hasegawa et al. |
| 2023/0204151 | A1* | 6/2023 | Kaplan ................ G06F 1/1601 |
| | | | 248/177.1 |

FOREIGN PATENT DOCUMENTS

| | | | |
|---|---|---|---|
| EP | 2563015 | A2 | 2/2013 |
| KR | 20000002782 | U | 2/2000 |
| KR | 100581854 | B1 | 5/2006 |

OTHER PUBLICATIONS

Written Opinion of the International Searching Authority mailed on Nov. 16, 2023, issued in connection with International Application No. PCT/GB23/51636 (10 pages).
Communication Pursuant to Rule 164(2)(b) and Article 94(3) EPC dated Jun. 8, 2026, issued by the European Patent Office in connection with European Patent Application No. 23736447.6 (8 pages).

* cited by examiner

Fig. 2

Fig. 6
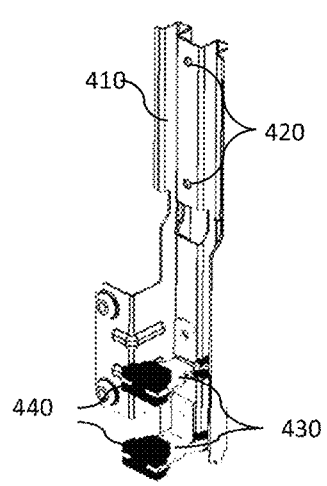
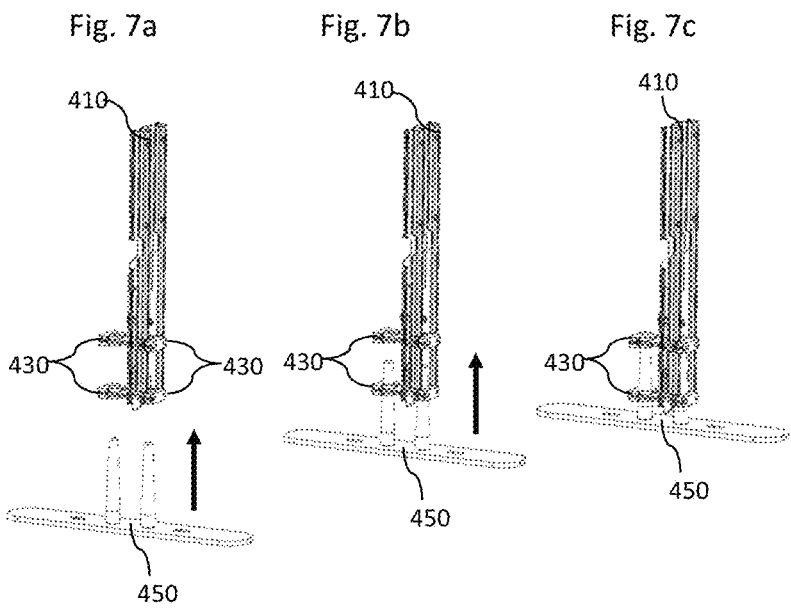
Fig. 7a                    Fig. 7b                    Fig. 7c

DISPLAY APPARATUS AND METHOD OF ASSEMBLY

CROSS-REFERENCE TO RELATED APPLICATIONS

This application is a continuation-in-part under 35 U.S.C. § 111(a) of, and claims the benefit of priority to, International Application No. PCT/GB2023/051636 filed on Jun. 22, 2023, which claims the benefit of priority to Great Britain Patent Application No. 2209142.5 filed on Jun. 22, 2022, the entire disclosures of which are expressly incorporated herein by reference.

FIELD OF THE INVENTION

The present invention relates to a display and methods and apparatus for assembling components of the display.

BACKGROUND OF THE INVENTION

Typical TV sets, monitors and other types of display include parts which are complex to assemble and may require many different fixing components.

Internal parts of the display may be susceptible to damage during assembly and/or transport, particularly when the display is part assembled.

Some displays include internal speakers, vibrations from which may affect other components of the display and/or cause sound distortion.

The end user may be required to assemble parts of the display, such as attaching a stand to the display. This typically requires tools, and may not result in a robust fitting.

SUMMARY OF THE INVENTION

Aspects of the invention are defined by the accompanying claims.

In an embodiment of the invention, a display apparatus comprises a display module, a frame for the display module, and a plurality of brackets that fix the frame to the display module. Each bracket includes a first portion arranged to contact or abut an inner surface of the frame, a second portion arranged to contact or abut an edge of the display module, and one or more slots arranged to engage one or more corresponding projections from the inner surface of the frame. The first and second portions of the brackets may be perpendicular to each other, and the second portion may be arranged to contact or abut the rear surface of the display module, which lies perpendicular to the inner surface of the frame.

The frame may include a lip that contacts or abuts the front edge of the display module, such that the edge of the display module is held between the second portions of the brackets, which abut the rear edge of the display module, and the lip.

Each bracket may include a third portion arranged to connect to a corresponding connector on a back cover of the display apparatus, so that the back cover may be fitted to the apparatus by connecting to the third portions of the brackets. The third portion may comprise a clip tab and the back cover may include locking clips for fastening to the clip tabs.

Each bracket may include one or more further portions which facilitate sliding the bracket along the edge of the display module so that the one or more slots engage the one or more projections. The further portions may comprise contact surfaces that extend away from the second portion, which may also lie perpendicularly to the first portion.

In another embodiment of the invention, a display apparatus comprises a display module and an internal support frame. One or more electronic components, such as a printed circuit board or a chip-on-flex component, may be located or housed between the display module and the internal support frame so as to protect the components from damage, for example during transport of the display when partly assembled. The internal support frame may support one or more components of the display, such as one or more speakers which are mounted on the internal support frame.

In another embodiment of the invention, a display apparatus has at least one internal stand mounting bracket and a base stand having at least one stand rod. Each internal stand mounting bracket provides a slot for receiving a corresponding said stand rod so that the display is secured to the stand. The stand rods may be removably attached to the base stand. The base stand may be a discrete base designed to rest on a surface, such as a table or TV cabinet. Alternatively, the stand rods may be attached to an item of furniture, such as the top surface of a table or TV cabinet, so that the display is secured to the item of furniture.

The stand mounting bracket may include one or more resilient parts for receiving and securing the stand rod within the slot. The resilient part may be a rubber cap or washer.

Each internal stand mounting bracket may include one or more slots arranged to receive one or more stand rods arranged at one end of the stand. The stand rods may be separated in a direction perpendicular to the screen of the display. This may provide a more stable support for the display.

Different embodiments may be combined together in the same display apparatus. For example, the stand mounting bracket may be mounted on or connected to the internal support frame.

BRIEF DESCRIPTION OF THE DRAWINGS

There now follows, by way of example only, a detailed description of embodiments of the present invention, with reference to the figures identified below.

FIG. 2 is a perspective view of a bracket in a first embodiment of the invention.

FIG. 6 shows a stand mounting bracket in a third embodiment of the invention.

FIGS. 7*a* to 7*c* show stand support rods being placed into the stand mounting bracket.

DETAILED DESCRIPTION

Figure 1A:
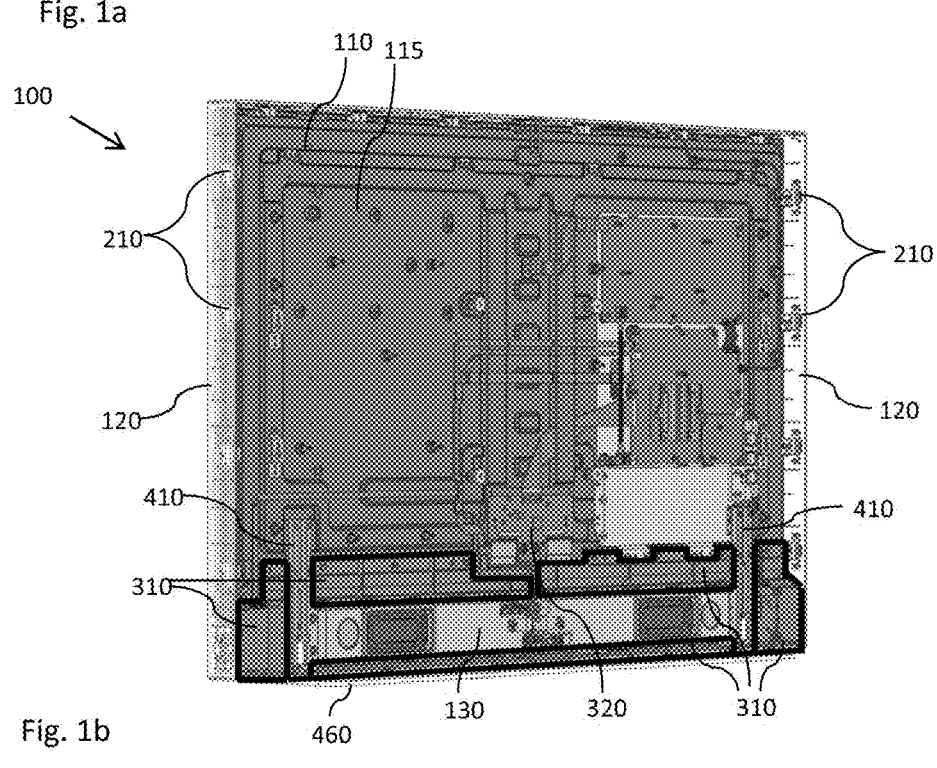
FIGS. 1a and 1b are respectively rear and front perspective views of a display including embodiments of the invention.
Figure 1B:
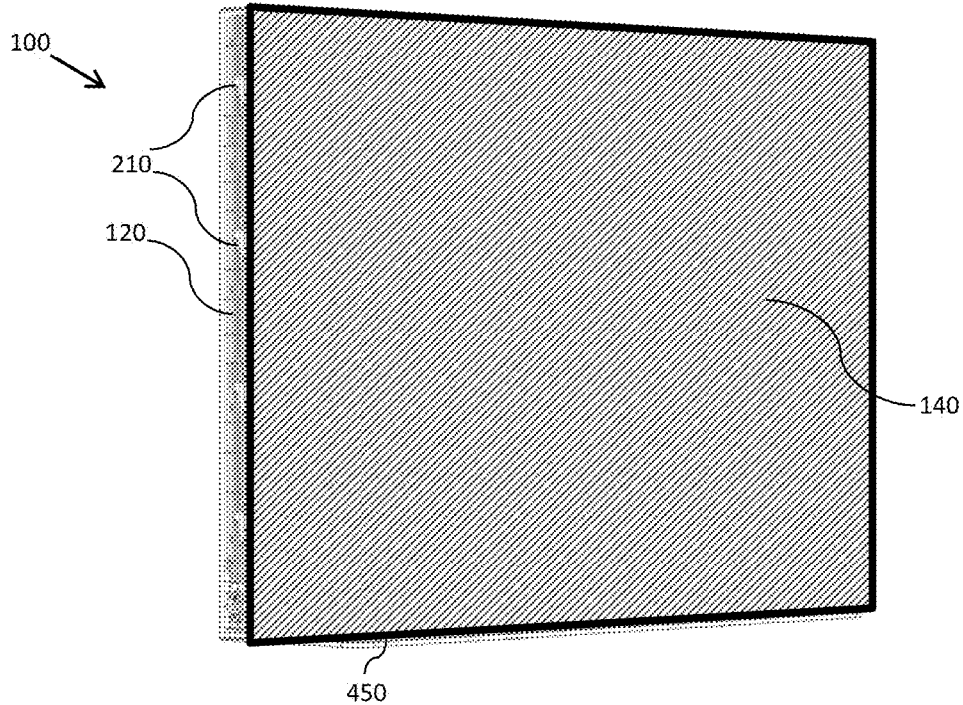

One or more embodiments of the invention may be included in a display 100, such as a TV panel, monitor or other type of display comprising a display module 110, including a display screen, a frame 120 and a back cover 140, which may be an outer cover or an internal cover of the display 100. In the following description, except where otherwise indicated directional references such as front, back and vertical are with reference to the display in a normal orientation, such as in use.

Figure 2:
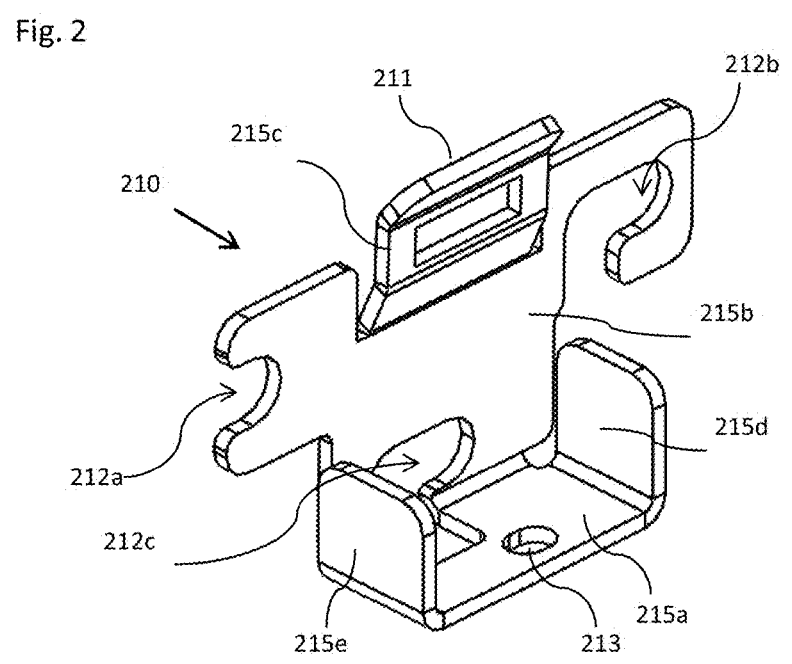

A first embodiment of the invention comprises a bracket 210, as shown in FIG. 2, for connecting the display module 110, frame 120, and back cover 140 together in a simple and secure manner. The bracket 210 may have multiple different portions 215*a*, 215*b*, 215*c* that connect respectively to the display module 110, frame 120, and back cover 140.

A first portion 215*a* is arranged to contact an edge of the display module 110 and is arranged to be fixed to the edge, for example by means of a hole 213 through which a screw or other fixing means may pass, for fixing in a corresponding hole 214 in the edge of the display module 110. The first portion 215*a* may be flat and planar and may be arranged to abut the rear surface of the display module 110.

A second portion 215*b* is flat and planar and extends perpendicularly from the first portion 215*a*. The second portion 215*b* includes one or more slots 212 extending in a direction parallel to the first portion 215*a*. In this specific embodiment, a first slot 212*a* at one side of the second portion 215*b* is open at one side and is formed between a pair of projections extending on that side. A second slot 212*b* on an opposite side of the second portion 215*b* is a right-angled slot that opens in a direction towards the first portion 215*a*, and is formed by a hook-shaped projection. A third slot 212*c* at the bottom of the second portion 215*b* is a right-angled slot having a lower opening that extends into the first portion 215*a*.

A third portion 215*c* extends from the second portion 215*b* at an angle, in a direction away from frame 120 and towards the first portion 215*a*. The third portion 215*c* may include an opening and multiple angled sections, such that the opening is positioned away from but parallel to the frame 120.

A fourth 215*d* and fifth 215*e* portion may extend from the first portion 215*a* such that they are perpendicular to the first and second portions 215*a*, 215*b*. These portions 215*d*, 215*e* have surfaces that may allow the bracket 210 to be easily pushed by hand along the edge of the display module 110 when the first portion 215*a* rests on the rear surface of the display module 110.

The bracket 210 may be a single piece of material. The bracket 210 may be made from metal or plastic, for example.

The bracket 210 may be manufactured by stamping or any corresponding appropriate method for the material used.

FIGS. 3*a*-3*d* show the bracket 210 being placed into position between the display module 110 and the frame 120. One or more protrusions or pegs, in this case first, second and third pegs 220*a*-*c*, are arranged at locations on the inward-facing side of the frame 120 so as to fit into the corresponding slots 212*a*-*c* of the bracket 210. The pegs 220*a*-*c* extend perpendicularly inwards from the frame 120 and each have a flange, extension or lip 222 on or around their inner ends.

Figure 3A:
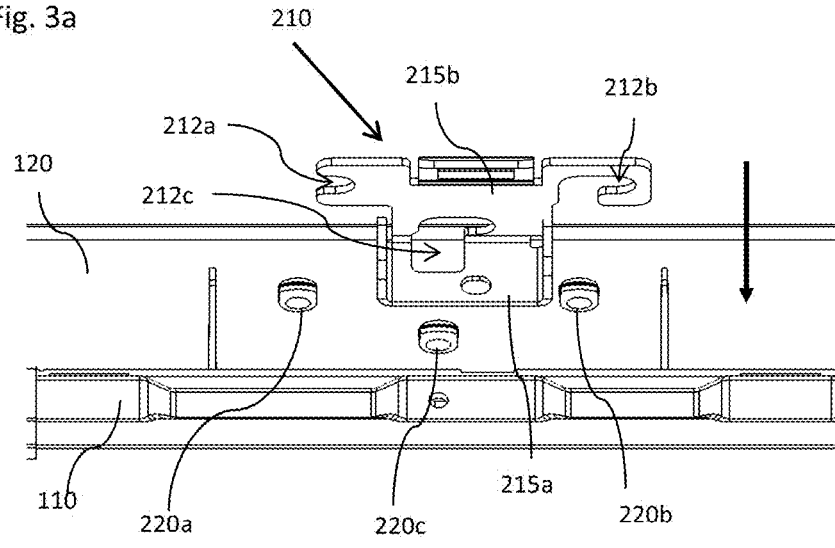
FIGS. 3a, 3b, 3c, and 3d show the bracket being placed into position.

First, as shown in FIG. 3*a* the bracket 210 is positioned such that the second portion 215*b* rests against the inner surface of the frame 120 and is slid downwards as indicated by the arrow so that the first peg 220 is aligned horizontally with the first slot 212*a* and the second and third pegs 220*b*, 220*c* enter the lower parts of the respective second and third slots 212*b*, 212*c*.

Figure 3B:
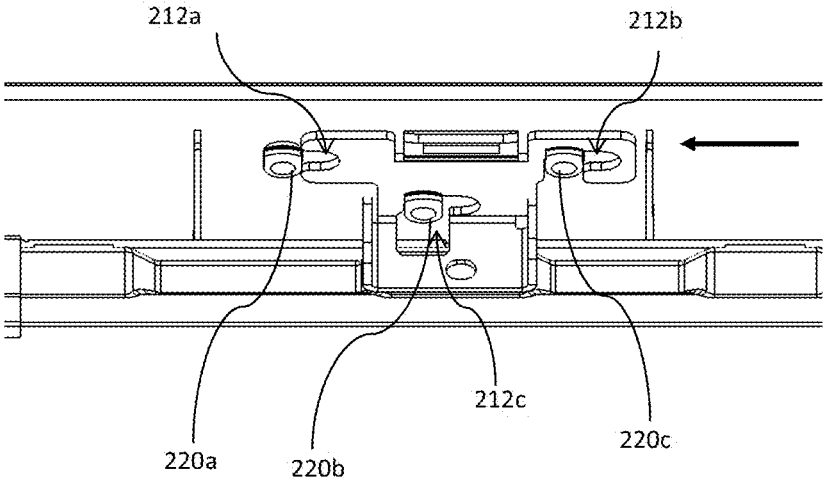

The bracket 210 is then slid horizontally into its final position, as indicated by leftward arrow in FIG. 3*b*, so that the pegs 220*a*-*c* move to the ends of the respective slots 212*a*-*c*. In this position, the flange, extension or lip on the inner end of the pegs 220*a*-*c* holds the bracket 210 in position on the frame 120.

Figure 3C:
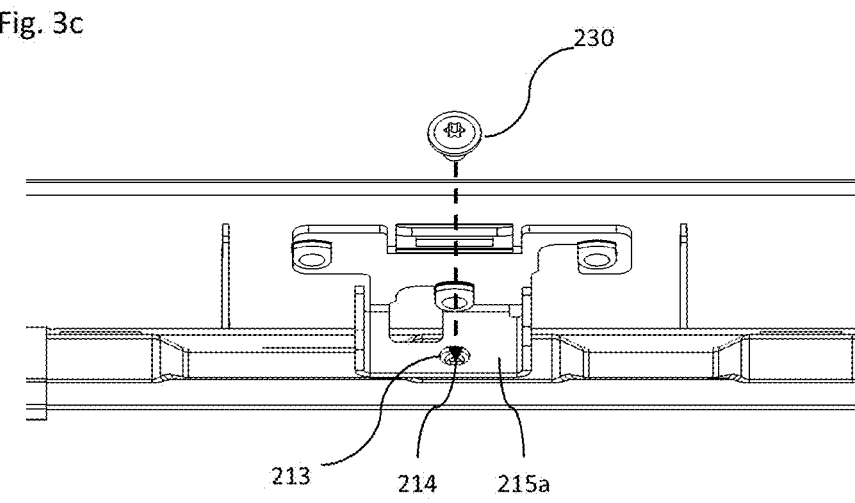
Figure 3D:
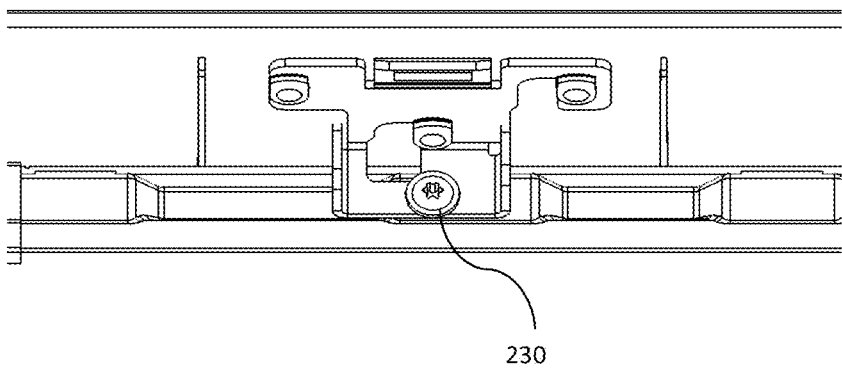

With the bracket 210 is in its final position, the hole 213 in the first portion 215*a* is aligned with the corresponding hole 214 in the display module 110, as shown in FIG. 3*c*. The bracket 210 is then secured to the display module 110 by a fixing article 230, such as a screw, passing through the holes 213, 214 and securing the display module 110 to the frame 120, as shown in FIGS. 3*d* and 4*a*-4*c*. In this position, the lips 222 on the pegs 220 also secure the bracket 210 to the frame 120. As an alternative to the fixing article 230 and holes 213, 214, the first portion 215*a* may be fixed to the edge of the display module 110 using adhesive, heat staking (in the case of a plastic bracket 210), or other fixing means.

The connecting method described above may connect the frame 120 to the display module 110 using just one fixing (such as fixing article 230) per bracket 210. This simplifies the assembly process of the display 100 and reduces the overall number of components.

Figure 4A:
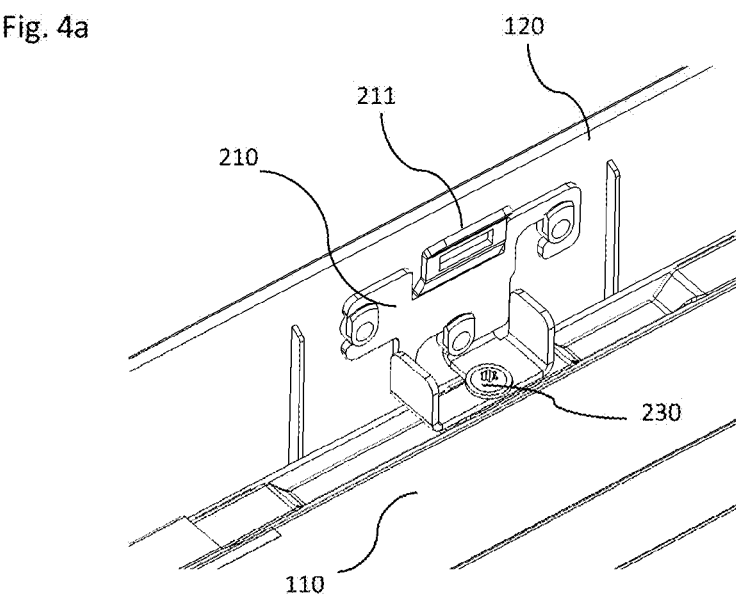
FIG. 4a shows the bracket in position, connecting a frame to a display module.
Figure 4B:
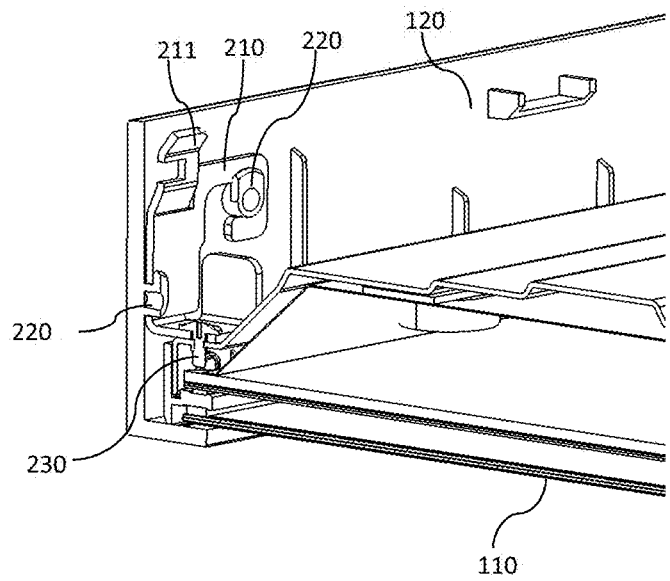
FIG. 4b is a cross-sectional view through the bracket in position, connecting the frame to the display module.
Figure 4C:
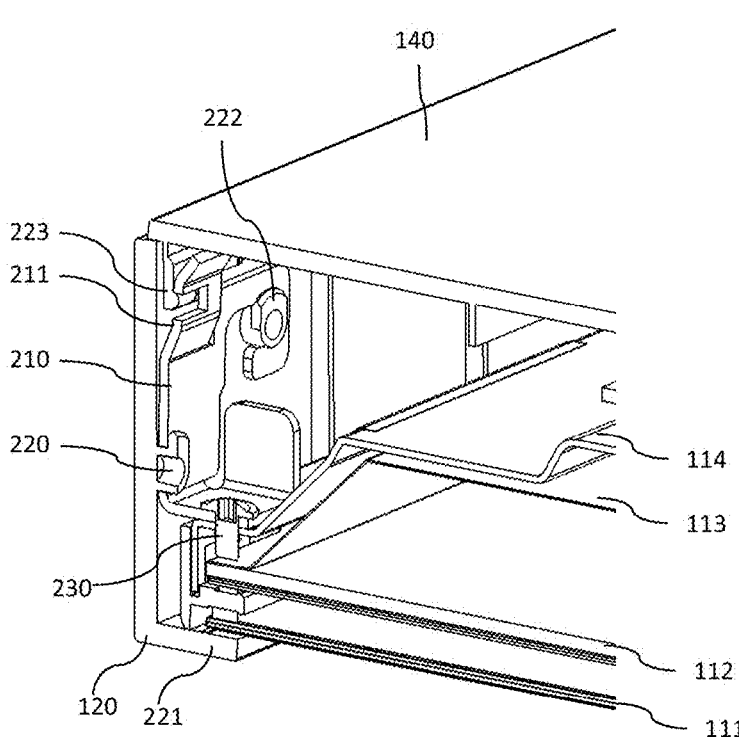
FIG. 4c is a cross-sectional view through the bracket in position with a back cover connected to the bracket.

As shown in FIGS. 4*b* and 4*c*, the frame 120 may include a lip 221 that extends perpendicularly inwards from the front of the frame 120. In a method of assembly, the display module 110 may be positioned within the frame 120 so that the front edges of the display module 110 rest against the inner surface of the lip 221. The brackets 210 are then attached to the frame 120 and to the rear edges of the display module 110, such that the edge of the display module 110 is held between the lip 221 and the first portions 215*a* of the brackets 210 as shown in FIGS. 4*b* and 4*c*.

As shown in cross-section in FIGS. 4*b* and 4*c*, the display module 110 may comprise a display screen 111, an inner plate 112, an inner bracket 113 and a backplate 114 in which are located the holes 214 for attachment of the brackets 210. The display screen 111 may be an LCD display screen, although other display technologies may alternatively be used. The display module 110 may also include electronics to drive the display, either within or attached to the backplate 114.

The brackets 210 may also include connectors for attachment of the back cover 140 to the frame 120. In this way, the brackets 210 may perform a dual function of attaching the frame 120 to the display module 110 and to the back cover 140. In the embodiment shown in FIG. 4*c*, the connector comprises the clip tab 211 and the back cover 140 includes complementary connectors in the form of locking clips 223 for attachment to the clip tabs 211, such that the locking clips 223 can be pushed between the frame 120 and the clip tabs 211 and hook into openings in the clip tabs 211. Advantageously, this may allow the back cover 140 to be attached without the need for openings in the back cover 140

A plurality of brackets 210 are attached at locations spaced apart around the edge of the display module 110, thus providing a securing mechanism for a significant proportion of the contact area between the display module 110, frame 120, and back cover 140. This arrangement may also strengthen and reinforce the frame 120.

A second embodiment of the invention, as shown in FIGS. 5a-5d, comprises an internal support frame 310 that is mounted to the lower edge of the display module 110, and provides a support for mounting internal components within the display 100. The internal support frame 310 may be attached to the backplate 114 of the display module 110 with screws or other fixing means. The internal components mounted on the support frame 310 may include speakers 130 and/or stand mounting brackets 410. The support frame 310 may simplify the mounting of internal components during assembly of the display 100 and may provide a standardised mounting that can be attached to different types or designs of display 100.

Mounting one or more speakers 130 to the internal support frame 310 may reduce vibrations from the speakers 130 and protect components of the display 100 from potential long term damage caused by the vibrations.

Figure 5A:
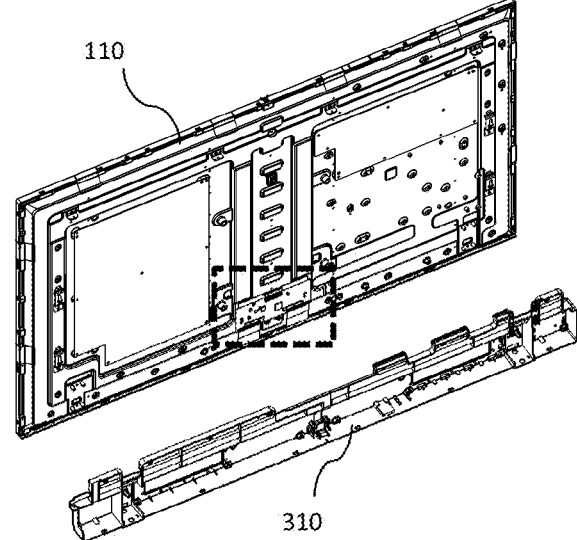
FIGS. 5a and 5b show a support frame in a second embodiment of the invention, respectively separate from and connected to the display module.
Figure 5B:
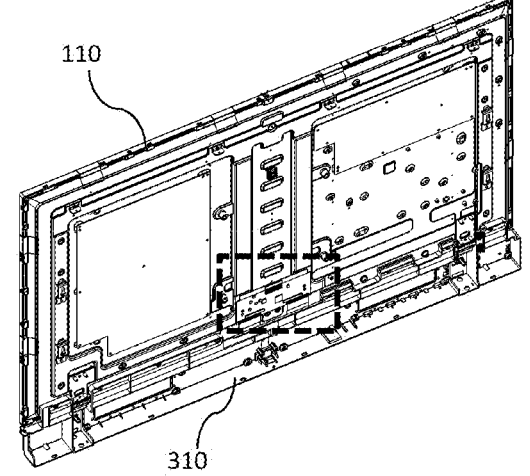
Figure 5C:
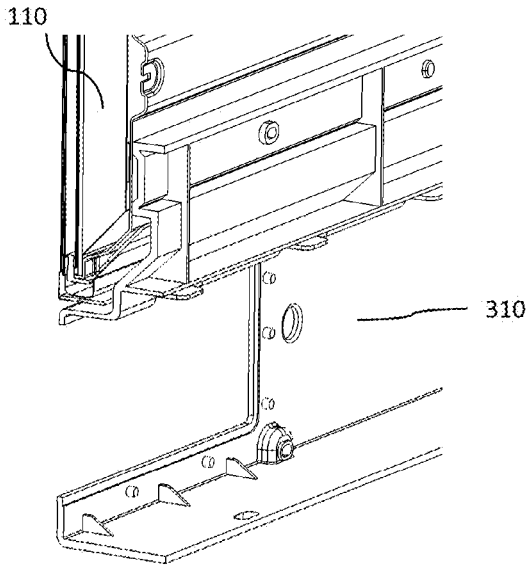
FIG. 5c shows a cross-sectional perspective view of part of the support frame connected to the display module in the second embodiment.
Figure 5D:
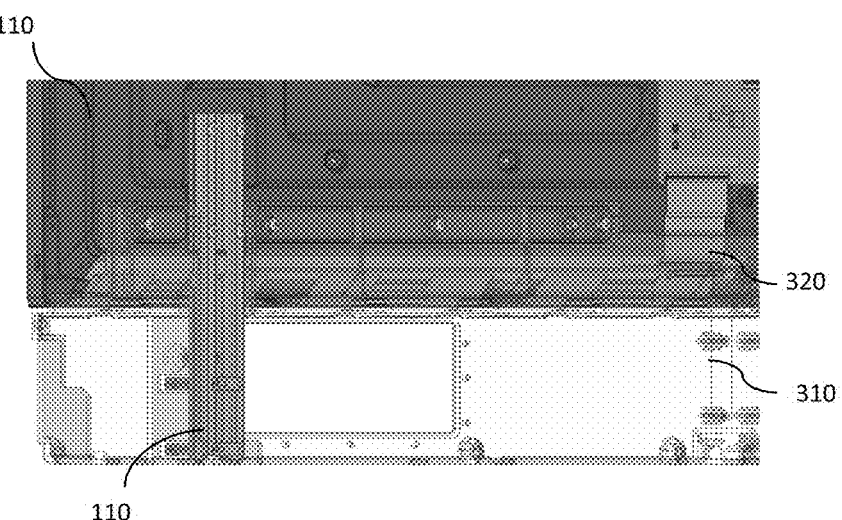
FIG. 5d is a perspective view showing electronic components located between the display module and the support frame.

Sensitive components 320 mounted on the back of the display module 110, such as printed circuit boards and chip-on-flex components, may be at least partially covered and protected by the internal support frame 310 as shown in FIG. 5d such that the components 320 are housed between the back of the display module 110 and an upper part of the internal support frame 310, therefore reducing the risk of damage to the components 320 during manufacture and transport.

The internal support frame 310 may also reinforce the display module 110, so providing extra structural integrity to the display 100.

In a third embodiment of the invention, the display 100 includes one or more internal stand mounting brackets 410 for attachment of a base stand 460 to the display 100. As shown in FIG. 5d, the stand mounting bracket(s) 410 may be connected to the backplate 114 of the display module 110, for example with screws or other fixing articles extending through openings or holes 420 in the stand mounting bracket(s) 410.

As shown in FIGS. 6 and 7a-c, the internal stand mounting brackets 410 include one or more (in this case, two) vertically extending slots 430 each of which is configured to receive a corresponding vertically extending member, such as stand rod 450 or other part shaped to fit the slots 430. The stand rods 450 may rotate, slide, or be pushed into the slots 430 as shown by the arrows in the Figures.

Figure 8:
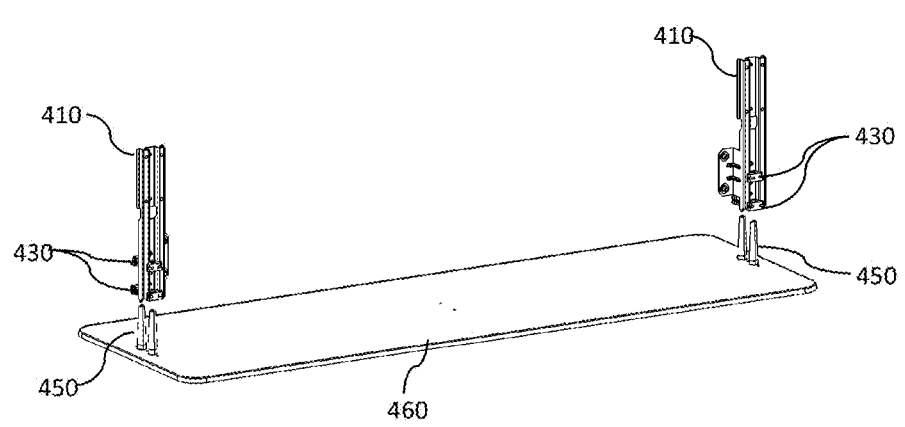
FIG. 8 shows a base stand including stand support rods being inserted into stand mounting brackets.
Figure 9A:
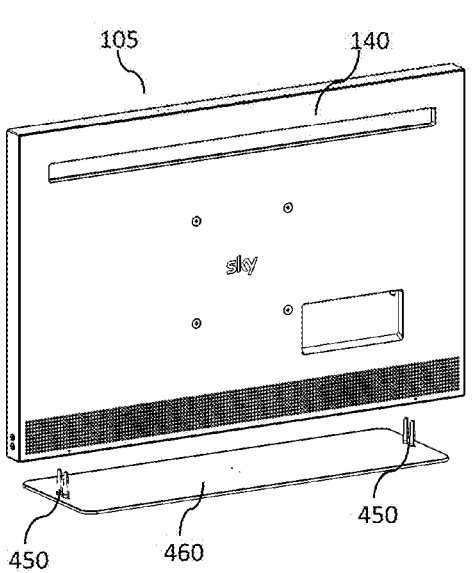
FIGS. 9*a* and 9*b* shows a base stand including stand support rods being inserted into stand mounting brackets within the display.
Figure 9B:
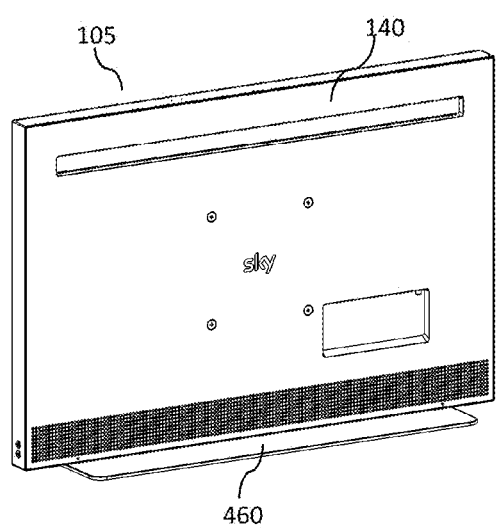
Figure 10A:
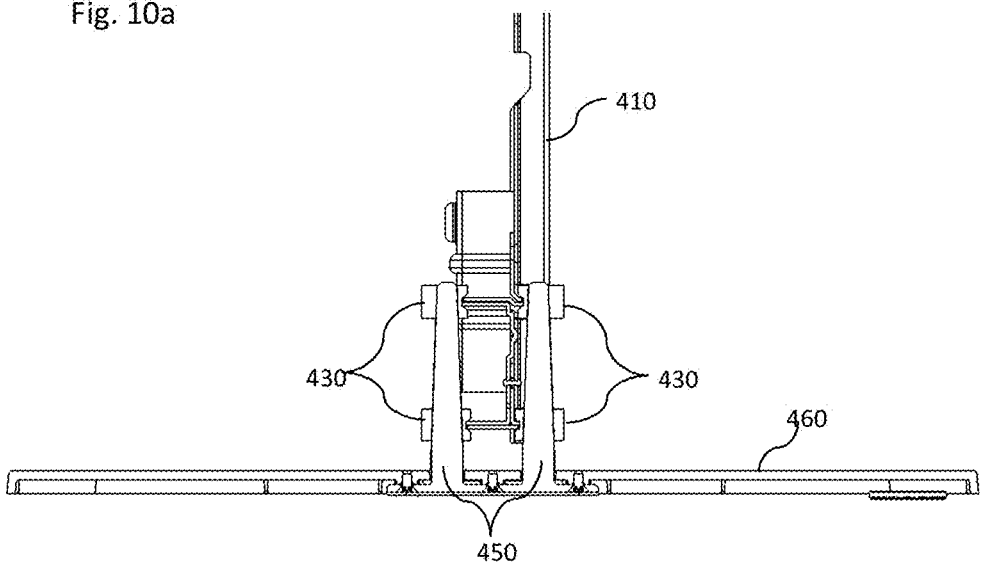
FIG. 10*a* is a cross-sectional diagram showing the stand support rods in position in one of the stand mounting brackets.
Figure 10B:
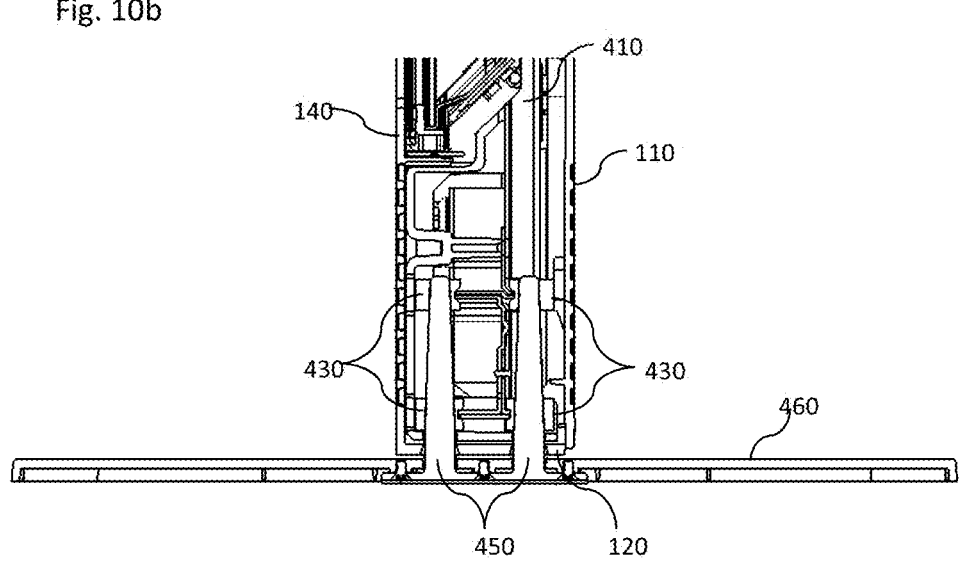
FIG. 10*b* is a cross-sectional diagram showing the stand support rods in position in one of the stand mounting brackets within the display.

The stand rods 450 may be connected to or form part of base stand 460, as shown in FIGS. 8 and 9a, for supporting the display 100 when the stand rods 450 are pushed into the mounting brackets 410. In this case, a pair of stand rods 450 are mounted at each end of the base stand 460. When in position, the display 100 is supported by the base stand 460 as shown in FIGS. 9a and 9b. The lower end of the frame 120 may abut the base stand 460 as shown in FIG. 10b.

The stand rods 450 may be removably attached to the base stand 460, for example by screws or by a sliding or twist fitting. The base stand may be a discrete base designed to rest on a surface, such as a table or TV cabinet. Alternatively, the stand rods 450 may be attached to an item of furniture, such as the top surface of a table or TV cabinet, so that the display 100 is secured to the item of furniture. In this way, the stand for the display 100 may not be visible to the user.

The internal stand mounting brackets 410 may be secured to the display module 110 and to the internal support frame 310, thus providing additional strength and stability.

Within each of the slots 430 may be arranged one or more resilient components 440 such as rubber caps, blocks or washers, providing a tight and secure connection between the internal stand mounting brackets 410 and the stand rods 450. This may prevent the base stand 460 from falling off the display 100 when the latter is moved or lifted up. This tight and secure connection may not require any additional fixing, such as screws or bolts, therefore simplifying the assembly process for the end user. The user may remove the base stand 460 from the display 100 by pulling firmly.

The resilient components 440 may dampen the vibrations caused by the speakers 130, thereby improving sound quality and/or preventing vibrations from passing into or through the base stand 460 and causing unwanted noise or distortion.

Variants of the above embodiments, which may occur to the skilled person on reading the above description, may nevertheless fall within the scope of the invention as defined by the following claims.

What is claimed is:

1. A display apparatus having a display module, an internal support frame attached to the display module, and at least one internal stand mounting bracket, connected to the internal support frame, for receiving at least one corresponding projecting member of a base stand, wherein each of the at least one internal stand mounting bracket provides at least one slot for receiving the at least one corresponding projecting member so as to secure the display apparatus onto the base stand, wherein each of the at least one internal stand mounting bracket includes one or more resilient parts for receiving and removably securing, within the at least one slot, the at least one corresponding projecting member.

2. The apparatus of claim 1, wherein each of the at least one internal stand mounting bracket provides a plurality of slots arranged to receive a respective plurality of projecting members.

3. The apparatus of claim 1, comprising a pair of the at least one internal stand mounting brackets arranged at opposite sides of the apparatus.

4. The apparatus of claim 1, including said base stand.

5. The apparatus of claim 4, wherein the base stand includes two pairs of projecting members, each pair arranged for insertion into a corresponding one of the at least one internal stand mounting brackets.

6. The apparatus of claim 4, wherein the at least one projecting member is removably attached or attachable to the base stand.

7. The apparatus of claim 4, wherein the base stand comprises a discrete base designed to rest on a surface.

8. The apparatus of claim 4, wherein the base stand comprises an item of furniture.

9. The apparatus of claim 4, wherein the base stand includes at least one projecting member arranged on each of two opposite sides of the base stand.

10. The apparatus of claim 1, wherein the one or more resilient parts comprise one or more resilient components arranged within the slot.

11. The apparatus of claim 10, wherein the one or more resilient components each comprise one of a rubber cap, block or washer.

12. The apparatus of claim 1, wherein at least one speaker is mounted on the internal support frame.

13. A display apparatus comprising a display and a base stand, the display having at least one internal stand mounting bracket for receiving at least one corresponding projecting member of the base stand, wherein each of the at least one internal stand mounting bracket provides at least one slot for receiving the at least one corresponding projecting member so as to secure the display onto the base stand, wherein each of the at least one internal stand mounting bracket includes one or more resilient parts for receiving and removably securing, within the at least one slot, the at least one corresponding projecting member, and wherein the base stand includes two pairs of projecting members, each pair arranged for insertion into a corresponding one of the at least one internal stand mounting brackets.

14. The apparatus of claim 13, wherein the pairs of projecting members are arranged on each of two opposite sides of the base stand.

15. A display apparatus comprising a display and a base stand, the display having at least one internal stand mounting bracket for receiving at least one corresponding projecting member of the base stand, wherein each of the at least one internal stand mounting bracket provides at least one slot for receiving the at least one corresponding projecting member so as to secure the display onto the base stand, wherein each of the at least one internal stand mounting bracket includes one or more resilient parts for receiving and removably securing, within the at least one slot, the at least one corresponding projecting member, and wherein the base stand includes at least one projecting member arranged on each of two opposite sides of the base stand.

16. The apparatus of claim 15, wherein the at least one projecting member is removably attached or attachable to the base stand.

17. The apparatus of claim 15, wherein the base stand comprises a discrete base designed to rest on a surface.

18. The apparatus of claim 15, wherein the base stand comprises an item of furniture.

* * * * *